US007096755B2

(12) United States Patent
Cha

(10) Patent No.: US 7,096,755 B2
(45) Date of Patent: Aug. 29, 2006

(54) BRAKE PEDAL ASSEMBLY FOR VEHICLE

(75) Inventor: Joon-Geun Cha, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 155 days.

(21) Appl. No.: 10/750,662

(22) Filed: Dec. 31, 2003

(65) Prior Publication Data

US 2005/0076737 A1 Apr. 14, 2005

(30) Foreign Application Priority Data

Oct. 10, 2003 (KR) ..................... 10-2003-0070555

(51) Int. Cl.
*G05G 1/14* (2006.01)
*B60K 28/10* (2006.01)

(52) U.S. Cl. ........................................ 74/512; 180/274

(58) Field of Classification Search .................. 74/512, 74/513, 560; 180/274, 271, 275; 384/296; B60T 7/06
See application file for complete search history.

(56) References Cited

U.S. PATENT DOCUMENTS

| | | | | |
|---|---|---|---|---|
| 4,637,741 A * | 1/1987 | Gillet | | 384/428 |
| 5,015,104 A * | 5/1991 | Sato | | 384/296 |
| 5,615,749 A * | 4/1997 | Kato | | 180/274 |
| 5,848,558 A * | 12/1998 | Isono et al. | | 74/512 |
| 6,101,894 A * | 8/2000 | Tiemann et al. | | 74/512 |
| 6,499,376 B1 * | 12/2002 | Thistleton et al. | | 74/512 |
| 6,571,900 B1 * | 6/2003 | Thistleton | | 180/274 |
| 6,752,038 B1 * | 6/2004 | Cordero | | 74/512 |
| 2005/0103151 A1 * | 5/2005 | Yoon | | 74/512 |

FOREIGN PATENT DOCUMENTS

| | | | | |
|---|---|---|---|---|
| DE | 44 09 235 A1 | | 10/1994 | |
| DE | 297 13 799 U1 | | 1/1999 | |
| JP | 2001-55124 | * | 2/2001 | |
| JP | 2002-67899 | | 3/2002 | 74/512 |

* cited by examiner

*Primary Examiner*—Vinh T. Luong
(74) *Attorney, Agent, or Firm*—Morgan Lewis & Bockius LLP

(57) ABSTRACT

In order to prevent being thrust toward a driver when a collision occurs, a brake pedal assembly comprises a dash bracket configured to be fixed to a dash panel, a cowl bracket configured to be fixed to a cowl cross member, a hinge supporting part between the dash bracket and the cowl bracket, and a hinge releasing mechanism between the dash bracket and the cowl bracket. The hinge releasing mechanism preferably includes two linear sliding sides formed to face each other and to be inclined relative to a moving direction of the dash bracket and a ball inserted between the sliding sides. The hinge supporting part preferably includes two grooves formed by recesses at the sliding sides of the dash bracket and the cowl bracket.

2 Claims, 2 Drawing Sheets

BRAKE PEDAL ASSEMBLY FOR VEHICLE

CROSS-REFERENCE TO RELATED APPLICATIONS

This application claims priority to Korean Application No. 10-2003-0070555, filed on Oct. 10, 2003, the disclosure of which is incorporated fully herein by reference.

FIELD OF THE INVENTION

Generally, the present invention relates to a vehicle brake pedal assembly. More particularly, the brake pedal assembly helps prevent injury to a driver depressing the brake pedal during a collision.

BACKGROUND OF THE INVENTION

Typically, when a vehicle collision takes place, a dash panel and brake pedal assembly are likely to thrust toward a driver due to a deformation of the vehicle engine compartment. The driver, forcibly depressing the brake pedal at this time typically injures his or her ankle and/or tibia.

SUMMARY OF THE INVENTION

An embodiment of the present invention provides a brake pedal assembly for a vehicle adapted to reduce injury to a driver's ankle and/or tibia when receiving impact from the brake pedal assembly during a vehicle collision.

In a preferred embodiment, the brake pedal assembly for a vehicle comprises a dash bracket fixed to a dash panel. A cowl bracket is fixed to a cowl cross member. A hinge supporting part is formed between the dash bracket and the cowl bracket for pivotally supporting a brake pedal hinge. A hinge releasing means is placed between the dash bracket and the cowl bracket for releasing the hinge supporting part from a restrictive state while the dash bracket moves relatively in relation to the cowl bracket.

BRIEF DESCRIPTION OF THE DRAWINGS

For a better understanding of the nature and objects of the present invention, reference should be made to the following detailed description with the accompanying drawings, in which.

DETAILED DESCRIPTION OF PREFERRED EMBODIMENTS

Figure 1:
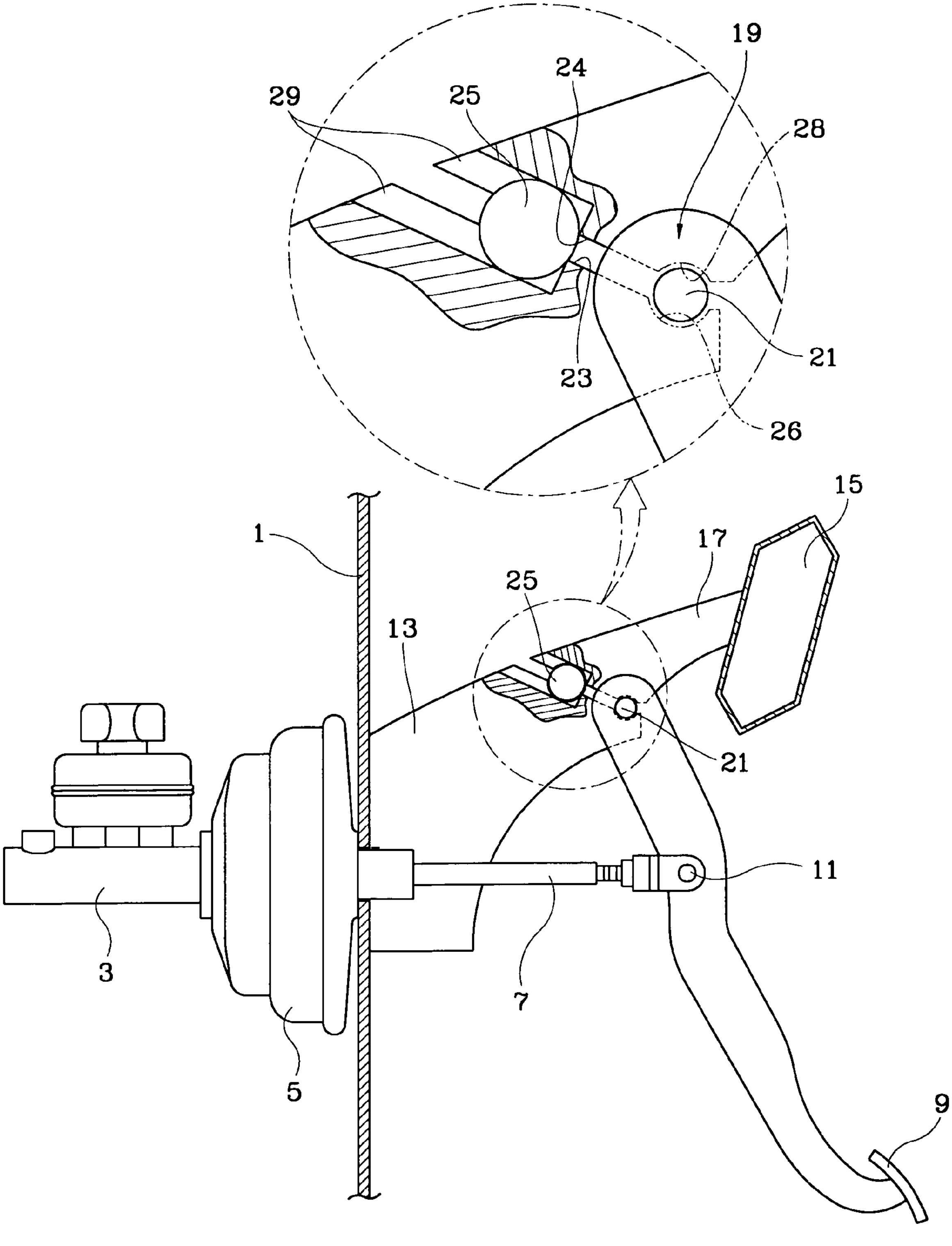
FIG. 1 illustrates a brake pedal assembly for a vehicle according to an embodiment of the present invention.

As shown in FIG. 1, a dash panel 1 is installed with a brake master cylinder 3 and a booster 5. A pushrod 7 penetrating the dash panel 1 from the booster 5 is coupled to a brake pedal 9 via a hinge 11. The brake pedal 9 is pivotally supported by a brake pedal hinge 21 and a hinge supporting part 19, which is formed between a dash bracket 13 fixed to the dash panel 1 and a cowl bracket 17 fixed to a cowl cross member 15.

A hinge releasing means is placed between the dash bracket 13 and the cowl bracket 17 for releasing the hinge supporting part 19 from a restrictive state when the dash bracket 13 moves relatively in relation to the cowl bracket 17. The hinge releasing means includes two linear sliding sides 23, 24 and a ball 25, wherein the linear sliding sides 23 and 24 are formed to face each other between the dash bracket 13 and cowl bracket 17 and to be inclined in relation to a moving direction of the dash bracket 13 during a collision, and the ball 25 is inserted between the two linear sliding sides 23 and 24.

In the event of a collision, the dash bracket 13 moves towards the driver by a force of a horizontal direction, so that the two linear sliding sides 23, 24 are formed slantingly from the horizon. The linear sliding side 23 of the dash bracket 13 according to an embodiment of the present invention is placed lower than the linear sliding side 24 of the cowl bracket 17. The ball 25 is inserted into a sliding groove 29 configured between the two linear sliding sides 23 and 24.

The hinge supporting part 19 is constituted by a lower side groove 26 and an upper side groove 28. The lower side groove 26 is formed by a recess at a lower side of the linear sliding side 23 of the dash bracket 13. The upper side groove 28, on the other hand, is formed by a recess at the linear sliding side 24 of the cowl bracket 17.

When the dash bracket 13 moves relatively in relation to the cowl bracket 17, the hinge releasing means releases the brake pedal hinge 21 from a restrictive state of enclosing the brake pedal hinge 21 via the upper side groove 28 and lower side groove 26. The hinge releasing means can also be embodied by using only the two linear sliding sides 23 and 24 without including the ball 25 where the two linear sliding sides 23 and 24 are formed to face each other between the cowl bracket 17 and dash bracket 13 for linearly sliding therebetween in opposing directions.

If the ball 25 is inserted between the linear sliding sides 23 and 24 like the embodiment of the present invention, there is likely to contain a gap between the two linear sliding sides 23, 24 of the cowl bracket 13 and dash bracket 17, thereby preventing a direct contact of the two linear sliding sides 23 and 24.

Figure 2:
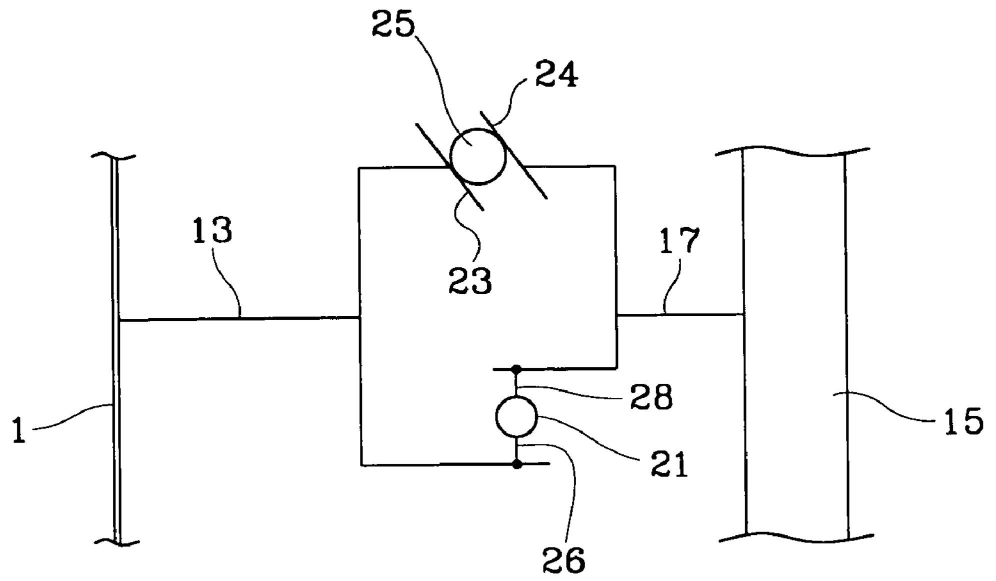
FIG. 2 is a schematic drawing of a brake pedal assembly for a vehicle according to an embodiment of the present invention, illustrating a normal state of the assembly before a collision occurs.
Figure 3:
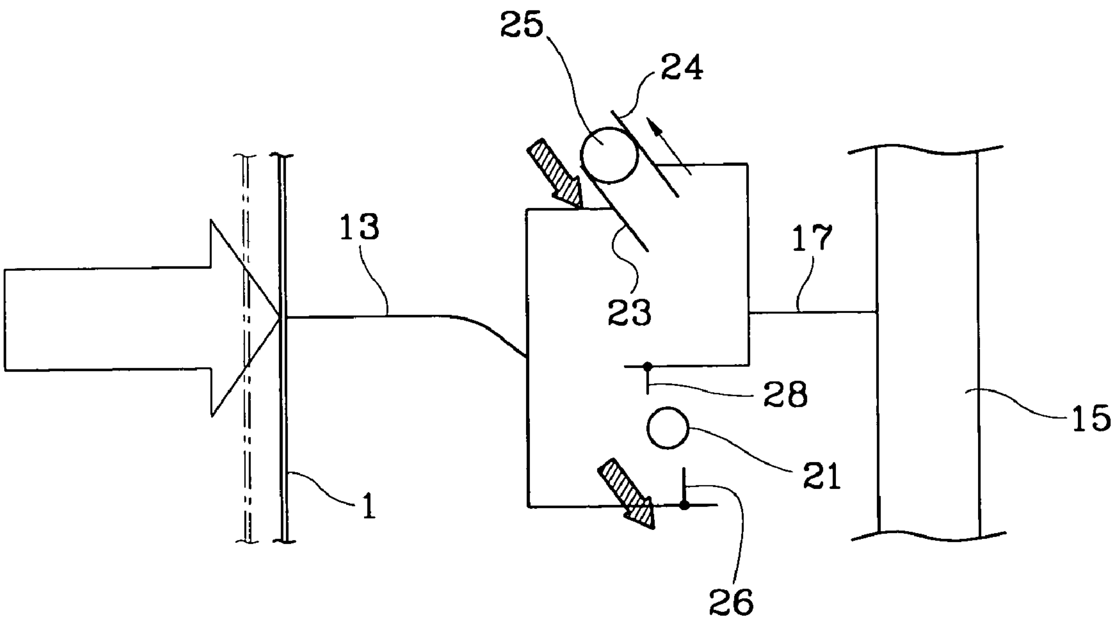
FIG. 3 is a schematic drawing of a brake pedal assembly for a vehicle according to an embodiment of the present invention, illustrating an operation state of the brake pedal assembly.

The operation of the embodiment of the present invention will now be described with reference to FIGS. 2 and 3. When the dash panel 1 moves toward a driver (to the right side in FIG. 3) due to a collision, the dash bracket 13 fixed to the dash panel 1 also moves toward the driver. The dash bracket 13 moves toward the driver as shown in the states from FIG. 2 to FIG. 3 by a force of a horizontal direction. However, when the dash bracket 13 is about to move toward the driver, the cowl bracket 17 fixed to the cowl cross member 15 remains steady, wherein the cowl cross member 15 is disposed further away from the front of the vehicle than the dash panel 1. While the cowl bracket 17 remains steady, the cowl bracket 13 moves toward a lower side of the cowl bracket 17 in a slanting direction by a sliding action of the two linear sliding sides 23, 24 and the ball 25.

The ball 25 helps the relative linear sliding action of the dash bracket 13 in relation to the cowl bracket 17 to be smoothly carried out. If the dash bracket 13 moves relatively in relation to the cowl bracket 17, the lower side groove 26 and the upper side groove 28 constituting the hinge supporting part 19 separate from each other, thereby the brake pedal hinge 21 is released from a restricted state.

Once the brake pedal hinge 21 is released from the restrictive state, the brake pedal 9 can pivot independently from the brake pedal hinge 21 via the hinge 11 coupled to the pushrod 7. Thus, even if the driver is depressing on the brake pedal 9 while the dash panel 1 moves toward the driver, the driver will receive no impact from the dash panel 1 and pushrod 7.

As the brake pedal 9 can pivot freely in relation to the hinge 11 coupled with the pushrod 7, no impact is transmitted from the pushrod 7 to the driver even if the pushrod 7 moves toward the driver.

As apparent from the foregoing, there is an advantage in the brake pedal assembly for a vehicle in that the brake pedal is released from the vehicle body during a vehicle collision, thus no impact upon the dash panel and pushrod is transmitted to the driver, thereby preventing or minimizing injury to the driver's ankle or tibia.

What is claimed is:

1. A brake pedal assembly for a vehicle, comprising:

a dash bracket configured to be fixed to a dash panel;

a cowl bracket configured to be fixed to a cowl cross member;

a hinge supporting part formed between said dash bracket and said cowl bracket for pivotally supporting a brake pedal hinge; and hinge releasing means placed between said dash bracket and said cowl bracket for releasing said hinge supporting part from a restrictive state when said dash bracket moves relatively in relation to said cowl bracket, wherein said hinge releasing means comprises:

two linear sliding sides formed to face each other between said dash bracket and said cowl bracket and to be inclined in relation to a moving direction of said dash bracket during a collision; and a ball inserted between said two linear sliding sides for reducing friction between said two linear sliding sides.

2. The assembly as defined in claim 1, wherein said hinge supporting part comprises:

a lower side groove formed by a recess at said linear sliding side of said dash bracket; and an upper side groove formed by a recess at said linear sliding side of said cowl bracket.

* * * * *